April 1, 1941.     L. S. ROTHSCHILD     2,236,783
VISUAL STOCK RECORD INDICATOR
Filed Sept. 5, 1939
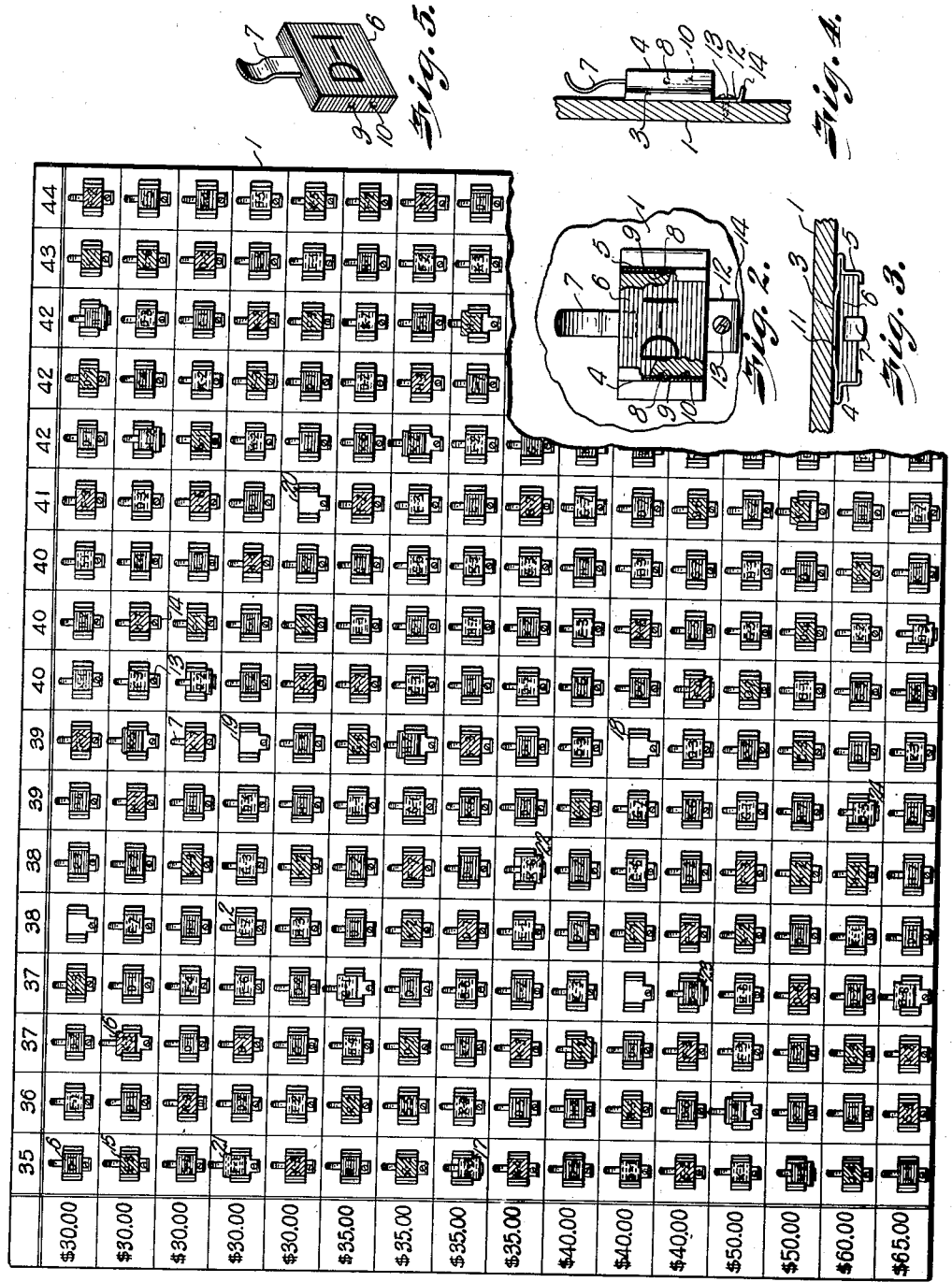
INVENTOR
Louis S. Rothschild
BY
ATTORNEY Patented Apr. 1, 1941

2,236,783

UNITED STATES PATENT OFFICE 2,236,783

VISUAL STOCK RECORD INDICATOR

Louis S. Rothschild, Kansas City, Mo.

Application September 5, 1939, Serial No. 293,394

3 Claims. (Cl. 116—135)

My invention relates to a visual stock record indicator and more particularly to a device for continuously indicating the entire stock of merchandise on hand with respect to prices, sizes, styles, colors and fabrics.

For purposes of illustration and not by way of limitation, I will describe my invention with respect to a visual stock record indicator for men's clothing, it being understood that my invention is applicable to any type of merchandise.

In an establishment which carries 5000 units of merchandise, the taking of an inventory entails large amounts of work, usually in the neighborhood of 12 man days. Four men, working three days will be required to take such an inventory.

In merchandising men's clothing, a merchant heretofore could form no accurate appraisal of what styles, colors and sizes of merchandise were selling better than others, without taking an inventory. The result has been that a merchant would find a season approaching its conclusion and a number of units of a certain color or style still on hand. This necessitates a sale at reduced prices, representing a distinct loss to the merchant. On the other hand, certain units will become very popular and an increased sale of these units, involving certain styles, colors or fabrics in certain sizes may exist. A merchant usually is not apprised of this situation until it is too late to reorder the particular units and receive them in time to make sales during the current season. My invention will enable a merchant to anticipate trends and reorder more popular merchandise sufficiently early to enable its sale during the current season. My invention provides a means permitting a merchant to discover the units which are backward and to make increased sales efforts with respect to these units sufficiently early to prevent a sizeable loss at the season's end.

One object of my invention is to provide a visual stock record indicator, indicating the number of units on hand, sold, or ordered.

Another object of my invention is to provide a visual stock indicator which will indicate the size, price, style and fabric of the various units of merchandise.

Other and further objects of my invention will appear from the following description.

In the accompanying drawing which forms part of the instant specification and is to be read in conjunction therewith and in which like reference numerals are used to indicate like parts in the various views—

Figure 1 is a front elevation of a visual stock record indicator showing one embodiment of my invention.

Figure 2 is an enlarged detail view of a fragment of my visual stock indicator, showing a front elevation of an indicating unit assembly with parts broken away.

Figure 3 is a top plan view of an indicating unit assembly shown in Figure 2.

Figure 4 is a side elevation of the indicating unit assembly shown in Figure 2.

Figure 5 is a perspective view of a portion of an indicator member adapted to be used in an indicating unit assembly of my invention.

More particularly referring now to the drawing, a base board 1 may be made out of wood, plastic material, aluminum or any suitable material. The base board 1 is provided with indicia along its top and side edges indicating price and size. The positioning of an indicating assembly on the board at the intersection of price and size indicates a unit of the price and size. For example, unit 2 would indicate a garment selling for $30.00 and being of size 38. Each of the indicating assemblies comprises a holder 3 made of metal or of any other suitable material. The holder is formed with a pair of side flanges 4 and 5 adapted to slidably receive an indicating member 6. The indicating member 6 is formed of a colored plastic material or of wood, metal or the like, painted or otherwise suitably colored. A handle 7 is embedded or otherwise secured to the indicating member 6. The side flanges 5 are provided with depressed portions 8, forming inwardly extending projections. The indicating member 6 is formed with reentrant portions 9 and 10, fashioned on its side walls. The depressed portions 8 of the flanges 4 and 5 are adapted to enter reentrant portions 9 and 10 and coact as detents to hold the indicating member 6 in a predetermined position. The flanges 4 and 5 are formed integral with a back portion 11, the shape of which can be readily seen by reference to Figure 3. The inherent resiliency of the back portion and the flanges 4 and 5 tends to spring the flanges toward each other, insuring the seating of the depressed portions 8 in the reentrant portions 9 and 10. The back portion 11 is formed with a downwardly projecting lug 12 by which the holder may be secured to the base board through the agency of a screw 13 or in any other suitable manner. The lug 12 is formed with a forwardly projecting flange 14 which acts as a stop to limit the lowermost position of the sliding indicator member 6. The sliding indicator member, besides being colored to indicate the color of the unit, bears a letter and a number. The letter indicates the fabric of which the unit is made and the number indicates its style.

The height of the sliding indicator is substantially equal or slightly smaller than the height of the side flanges 4 and 5. In the position shown in Figure 2, the depressed portions 8 are seated in reentrant portions 9, centering the sliding member 6 in the holder. In this position, the indicator will indicate that the garment is in stock. It will be noted that the indicators are hatched for various colors. Indicator member 6 is hatched for blue. Sliding member 15 is hatched for brown. Sliding member 16 is hatched for green. Sliding member 17 is hatched for gray.

It will be seen, by reference to Figure 1, that the various sliding members are colored to indicate various colors, these colors being the color of the unit represented by the indicator member. It will be seen by reference to Figure 1 that certain holders such as 18, 19 and 20, do not contain any sliding members.

When the sliding member is in the position shown by sliding member 16 and sliding member 21, the depressed portions 8 will be seated in reentrant portions 10 of the sliding member. In this position, the sliding members will project above the holders 3. In this position, the sliding member will indicate that the unit represented by it is ordered. For example, referring now to Figure 1, sliding member 16 is in a holder positioned under vertical column neated 37. This indicates that the unit is size 37. It is positioned, further, in a row marked $30.00. This indicates that the unit represented by the position of the holder retails for $30.00. It will be noted that the slide 16 in this holder, projects above the holder. This indicates that the unit is not in stock but has been ordered. The hatching of the sliding member indicates that it is colored green. The letter K on the slide indicates the fabric and the numeral 3 on the slide indicates the style.

Certain indicator units, such as 22, 23 and 24 are shown with the slide resting against the lower stop 14, that is, with a portion of the slide projecting below the holder. In this position, the slide indicates that the garment represented by it has been sold, the slide again indicating, by its color, the color of the garment and the letter indicating the fabric, and the numeral indicating the style. The position of the holder indicates the price and size of the garment by the column and row of its location.

In operation, the visual stock record indicator is continuously adjusted as garments are received, ordered or sold. If no garment has been in stock and sold, no slide member will be inserted in the holder. Such holders are shown in Figure 1, as, for example, at 18, 19 and 20.

A photograph of my visual stock record indicator may be taken daily, using film adapted to register colors. The transparency thus made may be dated and projected any time it is desired to refer to the condition of the stock on any particular day. It will be readily noted that pictures may be taken more or less frequently, if desired.

The film record thus made will be an accurate and faithful record of the merchandise on hand or on order at any particular time. The number of garments in sold position, of any particular size or style, will indicate the popularity or trend sales are taking.

It will be seen that I have accomplished the objects of my invention. By means of my visual stock record indicator, I am enabled to view the condition of the stock at all times. I have eliminated the necessity of the time, labor, and expense entailed in the taking of inventories. I am enabled rapidly and continuously to observe the units which are enjoying popular favor and those which are not selling. In this manner, I am enabled to reorder popular units seasonably and to make increased sales efforts to move the laggard units.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. In a visual stock record indicator having a board and a plurality of indicator units positioned on said board in vertical and horizontal alignment, each indicator unit including in combination a support having a pair of vertical guide flanges, a member substantially equal in vertical dimension to said guide flanges slidably positioned therein for selective movement to a position projecting vertically above said guide flanges, a position within said guide flanges and a position projecting vertically below said guide flanges to indicate whether said merchandise is ordered, in stock, or sold, and cooperating means on said member and support respectively for holding said member in each of said predetermined positions.

2. A visual stock record indicator unit as in claim 1 in which said support is formed with means springing said guide flanges toward each other whereby to exercise lateral pressure against the sides of said member through said guide flanges.

3. In a visual stock record indicator having a board and a plurality of indicator units positioned on said board in vertical and longitudinal alignment, each indicator unit including a support, a member of substantially the same vertical dimension as the support and slidably positioned thereon for selective movement to a position wherein the member projects above the support, an intermediate position wherein the vertical dimensions of the member and the support coincide, and a position wherein the member projects below the support, said relative positions of the member and support indicating whether stock is on order, in stock, or sold, and co-operative means on said member and said support for holding said member in each of said aforementioned positions.

LOUIS S. ROTHSCHILD.